United States Patent [19]

Zelinski et al.

[11] 3,860,566

[45] Jan. 14, 1975

[54] CAPPING AND CURING OF MERCAPTOELECHELIC POLYMERS

[75] Inventors: Robert P. Zelinski; Floyd E. Naylor, both of Bartlesville, Okla.

[73] Assignee: Phillips Petroleum Company, Bartlesville, Okla.

[22] Filed: Sept. 20, 1972

[21] Appl. No.: 290,502

[52] U.S. Cl. .................... 260/79.5 R, 260/79.5 NV
[51] Int. Cl. ............................................ C08f 27/06
[58] Field of Search ................ 260/79.5 R, 79.5 NV

[56] References Cited
UNITED STATES PATENTS

| | | | |
|---|---|---|---|
| 2,420,194 | 5/1947 | Richards | 260/79.5 NV |
| 3,240,844 | 3/1966 | Gruver | 260/79.5 R |
| 3,382,219 | 5/1968 | Trivette | 260/79.5 R |
| 3,705,882 | 12/1972 | Skillicorn | 260/79.5 R |

*Primary Examiner*—Harry Wong, Jr.

[57] ABSTRACT

A method of curing organolithium-initiated mercaptotelechelic polymers which involves esterifying the mercapto groups of the polymer to prevent spontaneous gelling of the polymer and subsequently converting the ester form to the mercapto form which is then cured.

9 Claims, No Drawings

CAPPING AND CURING OF MERCAPTOELECHELIC POLYMERS

This invention relates to the retardation of cure of mercaptotelechelic polymers.

In one of its more specific aspects, this invention relates to the stabilization of polymers which tend to crosslink on exposure to air, the stabilization facilitating the handling of the polymers.

The production of polymers containing mercapto groups is well known. Such polymers, when possessing more than one terminal mercapto group per polymer molecule can be cured and are of value in rubber formulations in that the mercapto endgroups permit tying the chain ends into the gel network through curing. However, such mercaptotelechelic polymers tend to self-cure with the result that storage instability problems occur. The method of the present invention is directed to the solution of such problems.

According to the present invention, there is provided a method of curing a lithium-initiated mercaptotelechelic polymer in which the polymer is contacted with a first reactant to convert the polymer to a stabilized ester derivative possessing essentially no tendency to cure. Thereafter, the ester derivative is contacted with a second reactant to convert the ester back to the mercaptotelechelic polymer in which form it is cured.

The method of this invention involves the inactivation of the mercaptan endgroups by converting the polymer to an ester form; the capped polymer is thereafter, at a selected time, reacted with a suitable hydrogen-donating compound to remove the capping group.

This invention is applicable to polymers formed by employing as an initiator an organoalkali metal compound, particularly an organolithium compound such as butyllithium and which thereafter have had the lithium endgroups converted to mercapto-endgroups by, for example, reaction with sulfur in cyclohexane solution. Such polymers include homopolymers of conjugated dienes and copolymers of vinyl-substituted aromatic hydrocarbons and conjugated dienes. Examples of such polymers are polybutadiene, polyisoprene, polypiperylene, poly(2,3-dimethyl-1,3-butadiene), butadiene-styrene copolymers, isoprene-styrene copolymers and the like.

The polymers are capped by employing as a first reactant any agent which can esterify the mercapto groups. Preferred agents are acyl halides of the formula

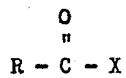

in which R is an alkyl, cycloalkyl, or aryl group or combination thereof including aralkyl, alkaryl and the like, and in which X is a halogen atom. Examples of such agents include acetyl chloride, propionyl fluoride, pivaloyl chloride, cyclohexanecarbonyl iodide, benzoyl bromide, phenylacetyl chloride, and p-toluenecarbonyl chloride. Acid anhydrides corresponding to the above-mentioned acyl halides can be used as alternates to the acyl halides when employing the required acid catalysts.

Any agent which possesses a hydrogen atom capable of replacing the capping group to regenerate the mercapto group in the polymer can be used for removal of the capping groups. Such agents will preferably be primary amines, secondary amines, alcohols in conjunction with catalysts, and water, optionally, with a catalyst.

The esterification reaction is preferably carried out in that solution in which the polymer was produced, the polymer being produced under prior art conditions. However, the solution containing the polymer can be diluted with inert solvents such as benzene, isooctane, heptane and the like.

The esterification is carried out at any suitable pressure and at a temperature within the range of from about 0° to 150°C. The capping agent is employed in an amount at least stoichiometrically equivalent to the amount of lithium present in the initiator employed in the production of the uncapped polymer. The capped polymer can be recovered and maintained in liquid form until it is desired to further process it for removal of the capping groups.

Removal of the capping group can be carried out using amines such as diethylamine, piperidine and aniline. Suitable alcohols include methyl alcohol, cyclohexanol, 1,6-hexanediol and the like in conjunction with catalysts such as the hydroxides, carbonates, bicarbonates and alkoxides of an element of Group IA and/or Group IIA of the Periodic Table, (Handbook of Chemistry and Physics, Chemical Rubber Company, 45th Edition (1964), p. B-2) catalysts such as sodium hydroxide, lithium carbonate, potassium bicarbonate, sodium methoxide, potassium-t-butoxide, magnesium hydroxide and the like being used optionally with the alcohols. These same catalysts can be used when water is employed for removal of the capping group.

The capping group is removed by contacting the capped polymer at a temperature within the range of from about 20° to about 100°C for a period of time dependent upon the temperature employed. For example, a reaction temperature of about 60°C will require a contact time of about 16 hours.

The second reagent is employed in an amount at least stoichiometrically equivalent to the amount of lithium present in the initiator employed in the production of the uncapped polymer.

After the removal of the capping group, the polymer can be cured in the usual manner, employing conventional curing agents if desired.

The operability of the method of the invention is illustrated in the following example.

EXAMPLE I 1,3-Butadiene was polymerized in cyclohexane solution employing dilithium isoprene as the initiator. The resulting polybutadiene-lithium was then converted by reaction with sulfur in cyclohexane to mercaptotelechelic polybutadiene. This polymer was divided into four portions, three of which was treated with acetyl chloride to convert them to the capped condition. The fourth portion, which had not been treated with acetyl chloride, gelled without further treatment.

Two portions of the capped polymer were then treated individually, one with an excess of methanolic potassium hydroxide and one with an excess of aqueous potassium hydroxide. Both portions gelled while the remaining portion of the polymer, still in the capped condition, remained ungelled.

These data indicate the operability of the method of the invention.

The following example illustrates the effectiveness of various "cap-removing" agents.

EXAMPLE II

A polymer was prepared by that method described in Example I. Thereafter, 200 mhm of sulfur were added to the polymerization mixture, the sulfur being added in 10 increments of 0.5 M solution in cyclohexane. The resulting mixture was maintained at 70°C for 0.5 hour to produce a mercaptotelechelic polymer.

The polymer so formed was converted to the ester derivative employing acetyl chloride. Acetyl chloride was added as a 1 M solution in cyclohexane. 4-Methyl-2,4-di-t-butylphenol (0.5 part) was added as a 10 weight percent solution in a toluene-isopropyl alcohol mixture. The polymer was recovered by washing the cyclohexane solution with 1 M hydrochloric acid, with water until neutral, and the solvent was removed at reduced pressures at a temperature of 100°–110°C.

The liquid polymer so produced was divided into portions and each portion was contacted with one of the cap-removing agents listed below. Contact was effected by mixing at room temperature for 16 hours at 60°C. The polymers which self-cured did so within this 16 hour period without employing a separate curing step. Results were as follows:

| Cap-Removing Agent | Quantity Employed, mhr (3) | Gel,% |
|---|---|---|
| 1,6-Hexanediol | 200 | 0 |
| Water | 500 | 22 |
| Piperidine | 80 | 54 |

The above data indicate that the 1,6-hexanediol, an alcohol, was ineffective without a catalyst in removing the capping agent and that water and piperidine are effective as previously noted.

It will be evident from the foregoing that various modifications can be made to the method of this invention. Such, however, are considered to be within the scope of the invention.

What is claimed is:

1. A method of curing an organolithium-initiated mercaptotelechelic polymer which tends to self-cure an exposure to air or heat which comprises:
   a. contacting said polymer with a first reactant to convert said polymer to an ester derivative;
   b. contacting the ester derivative with a second reactant to convert said ester derivative to a mercaptotelechelic polymer; and
   c. curing said mercaptotelechelic polymer, said polymer being selected from the group consisting of a lithium-intiated homopolymer of butadiene and a copolymer of butadiene and styrene, said first reactant is an acyl halide of the formula

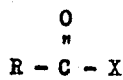

in which R is an alkyl, cycloalkyl, or aryl group or combination thereof, and in which X is a halogen atom, and said second reactant is selected from the group consisting of primary amines and secondary amines.

2. A method of curing an organolithium-initiated mercaptotelechelic polymer which tends to self-cure on exposure to air or heat which comprises:
   a. contacting said polymer with a first reactant to convert said polymer to an ester derivative;
   b. contacting the ester derivative with a second reactant to convert said ester derivative to a mercaptotelechelic polymer; and
   c. curing said mercaptotelechelic polymer, said polymer being selected from the group consisting of a lithium-initiated homopolymer of butadiene and a copolymer of butadiene and styrene, said first reactant is an acyl halide of the formula

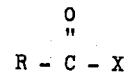

in which R is an alkyl, cycloalkyl, or aryl group or combination thereof, and in which X is a halogen atom, and said second reactant is an alcohol in conjunction with catalyst and wherein the alcohol is employed with a catalyst which aids conversion to said mercaptotelechelic polymer.

3. A method of curing an organolithium-initiated mercaptotelechelic polymer which tends to self-cure on exposure to air or heat which comprises:
   a. contacting said polymer with a first reactant to convert said polymer to an ester derivative;
   b. contacting the ester derivative with a second reactant to convert said ester derivative to a mercaptotelechelic polymer; and
   c. curing said mercaptotelechelic polymer, said polymer being selected from the group consisting of a lithium-initiated homopolymer of butadiene and a copolymer of butadiene and styrene, said first reactant is an acyl halide of the formula

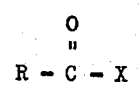

in which R is an alkyl, cycloalkyl, or aryl group or combination thereof, and in which X is a halogen atom, and said second reactant is water with catalyst and wherein the water reactant is employed in conjunction with a catalyst which aids conversion to said mercaptotelechelic polymer.

4. The method of claim 1 in which said polymer is produced by the copolymerization of 1,3-butadiene, said first reactant is acetyl chloride and said second reactant is piperidine.

5. The method of claim 2 in which said polymer is produced by the copolymerization of 1,3-butadiene, said first reactant is acetyl chloride and the alcohol of said second reactant is selected from the group consisting of methyl alcohol, cyclohexanol and 1,6-hexanediol.

6. The method of claim 3 in which said polymer is produced by the copolymerization of 1,3-butadiene with styrene, said first reactant is acetyl chloride and said second reactant is water together with a catalyst selected from the group consisting of the hydroxides, carbonates, bicarbonates and alkoxides of an element of Group IA and/or Group IIA of the Periodic Table.

7. The method of claim 1 in which said first reactant is employed in an amount at least stoichiometrically equivalent to the amount of lithium present in the lithium initiator employed in the production of said polymer and said second reactant is employed in an amount at least stoichiometrically equivalent to the amount of lithium present in the initiator employed in the production of said polymer.

8. The method of claim 2 in which said first reactant is employed in an amount at least stoichiometrically equivalent to the amount of lithium present in the lithium initiator employed in the production of said polymer and said second reactant is employed in an amount at least stoichiometrically equivalent to the amount of lithium present in the initiator employed in the production of said polymer.

9. The method of claim 3 in which said first reactant is employed in an amount at least stoichiometrically equivalent to the amount of lithium present in the lithium initiator employed in the production of said polymer and said second reactant is employed in an amount at least stoichiometrically equivalent to the amount of lithium present in the initiator employed in the production of said polymer.

* * * * *